June 1, 1926. 1,587,425

O. SCHEPP

COOLING ACCUMULATOR CELL

Filed Sept. 11, 1925

Inventor
Otto Schepp

Patented June 1, 1926.

1,587,425

UNITED STATES PATENT OFFICE.

OTTO SCHEPP, OF TOKIO, JAPAN.

COOLING ACCUMULATOR CELL.

Application filed September 11, 1925, Serial No. 55,833, and in Germany June 18, 1923.

The invention relates to cells for electric accumulators.

In order to constantly maintain the required readiness of function and to increase the life of accumulator cells which are frequently charged or are arranged in warm rooms, it is necessary to cool the electrolyte.

In a known cooling device of this character a cooling coil is arranged on the bottom of the accumulator box and cold water is made to flow through this coil. This kind of cooling, however, has the drawback that the electrolyte is cooled, it is true, in its lower portion but undergoes but an insufficient cooling in its upper layers.

The invention has for its object to obviate this drawback and attains this by the cooling coil being situated above the accumulator plates.

Figure 1:
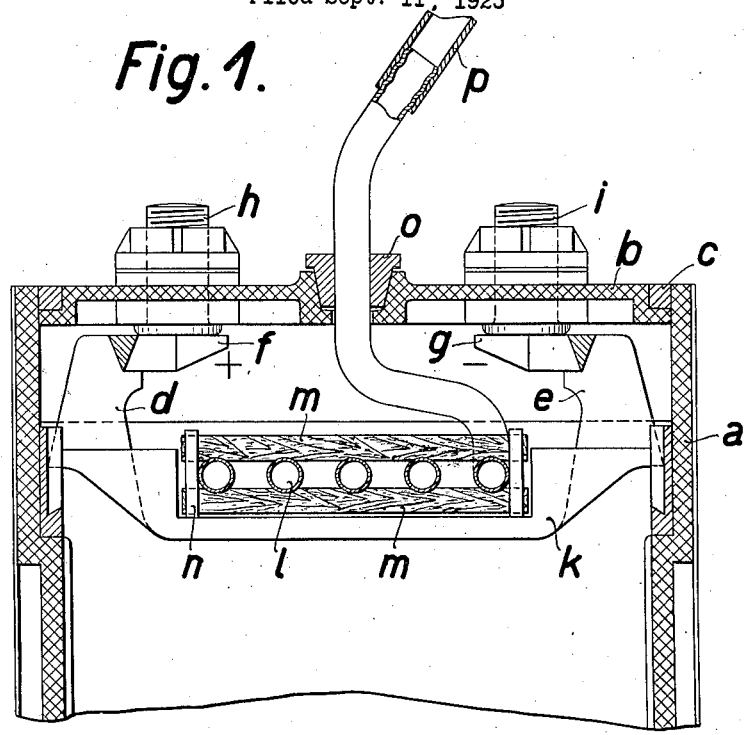
Figure 2:
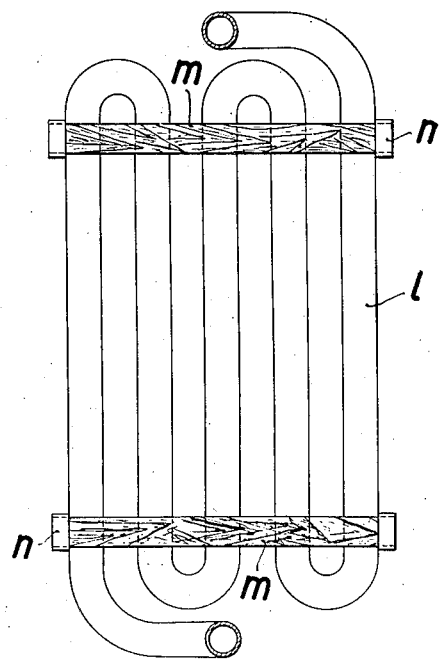

On the drawing is illustrated an embodiment of the subject-matter of the invention by way of example, Fig. 1 showing a vertical section through the upper portion of the accumulator cell, Fig. 2 showing a top view of the cooling coil.

$a$ denotes the hard rubber box of the cell which is closed by the hard rubber cover $b$ and tightened by filling out the groove $c$. The box $a$ has suspended in it, in the usual manner, the positive and negative plates $d$ and $e$, respectively, these plates being correspondingly connected by pole strips $f$ and $g$ and separated from each other by intermediate hard rubber plates $k$. The current is delivered at the poles $h$ and $i$. The intermediate plates are recessed so as to permit a cooling coil $l$ to be put in said recesses. The cooling coil $l$ is held together by means of wooden strips $m$ impregnated with paraffin and having bearing surfaces for the coil, and by rubber rings $n$. Connecting tubes through which the cooling liquid is supplied and led away, pass through the cover $b$ and are tightened by rubber packings $o$. The supply and delivery of the cooling medium to said connecting tubes is effected by rubber pipes $p$ put on them.

By arranging the cooling coil above the plates of the accumulator the result is obtained that a permanent circulation will take place within the electrolyte, the cooled layers of it sinking to the bottom of the cell and causing other portions of it to rise and to be exposed to the action of the cooling coil. A further advantage of the described cooling device resides in the fact that the cooling coil may be easily exchanged when damaged.

The described cooling device may of course also be applied to open accumulator cells.

I claim:

1. An accumulator cell having a box, electrolyte in said box, accumulator plates hanging in said electrolyte, a cooling coil situated within said electrolyte above said plates, and means for supplying a cooling medium to said coil.

2. An accumulator cell having a box, electrolyte in said box, accumulator plates hanging in said electrolyte, insulating plates arranged between said plates, a cooling coil situated within said electrolyte above said accumulator plates and resting on said insulating plates, and means for supplying a cooling medium to said coil.

3. An accumulator cell having a box, electrolyte in said box, accumulator plates hanging in said electrolyte, insulating plates arranged between said plates, recesses in said insulating plates, a cooling coil situated within said electrolyte above said accumulator plates and resting in said recesses of said insulating plates, and means for supplying a cooling medium to said coil.

OTTO SCHEPP.